US010652294B2

(12) United States Patent
Lewis et al.

(10) Patent No.: US 10,652,294 B2
(45) Date of Patent: May 12, 2020

(54) ANCHORS FOR LIVE STREAMS (71) Applicant: Google Inc., Mountain View, CA (US)

(72) Inventors: Justin Lewis, Marina del Rey, CA (US); Scott Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 536 days.

(21) Appl. No.: 15/339,874

(22) Filed: Oct. 31, 2016

(65) Prior Publication Data

US 2018/0124141 A1 May 3, 2018

(51) Int. Cl.
*H04L 29/06* (2006.01)
*H04N 21/845* (2011.01)
*H04N 21/234* (2011.01)
*H04N 21/2187* (2011.01)
*H04N 21/262* (2011.01)
*H04L 29/08* (2006.01)

(52) U.S. Cl.
CPC .......... *H04L 65/4084* (2013.01); *H04L 65/60* (2013.01); *H04L 67/32* (2013.01); *H04L 67/42* (2013.01); *H04N 21/2187* (2013.01); *H04N 21/23424* (2013.01); *H04N 21/26258* (2013.01); *H04N 21/8455* (2013.01)

(58) Field of Classification Search
CPC combination set(s) only.
See application file for complete search history.

(56) References Cited

U.S. PATENT DOCUMENTS

2006/0143669 A1\* 6/2006 Cohen .................. H04N 7/173
725/90
2011/0268427 A1\* 11/2011 Brelay .................. H04N 5/783
386/343

(Continued)

FOREIGN PATENT DOCUMENTS

EP 1675399 A2 6/2006
EP 2475146 A1 7/2012
EP 2775731 A1 9/2014

OTHER PUBLICATIONS

PCT International Search Report and Written Opinion for International Application No. PCT/US2017/054159, dated Jan. 3, 2018, 14 pages.

(Continued)

*Primary Examiner* — Philip J Chea
*Assistant Examiner* — Mohammed Ahmed
(74) *Attorney, Agent, or Firm* — Lowenstein Sandler LLP (57) ABSTRACT A stream hosting server generates anchors associated with a live stream, each anchor specifying a timestamp of the live stream that represents an opportune moment for a user to join the live stream. When a viewer client device sends a request to join the live stream, the stream hosting server analyzes the anchor list and selects an appropriate anchor. The stream hosting server provides the live stream to the viewer client device beginning at the timestamp specified by the anchor. Thus, the viewer client device can begin displaying the live stream at the opportune moment specified by the anchor. The stream hosting server also creates video on demand content that include a completed live stream as well as anchors associated with the live stream. The viewer client device can display the VOD beginning at different anchors.

20 Claims, 5 Drawing Sheets (56) References Cited

U.S. PATENT DOCUMENTS

2011/0271092 A1\* 11/2011 Brelay ................ G11B 27/005
 713/150
2016/0277802 A1 9/2016 Bernstein et al.
2016/0359940 A1\* 12/2016 Chen ................... H04L 65/4069

OTHER PUBLICATIONS

Written Opinion of the International Preliminary Examining Authority for International Application No. PCT/US2017/054159, dated Aug. 16, 2018, 8 pages.

\* cited by examiner

ANCHORS FOR LIVE STREAMS

BACKGROUND

This disclosure generally relates to live streams, and more specifically, to generating anchors in a live stream to enable users that are joining or rejoining the live stream to enter at an opportune time.

Stream hosting servers, such as YOUTUBE, serve as a platform for stream creators to provide live streams to users of the stream hosting server. In many scenarios, a user uses a client device to access and join the live stream. For popular streams, a creator of a stream may achieve large numbers of viewers who are interested in the information being presented by the creator.

However, a problem unique to live streams is that viewers may join at various, suboptimal times. For example, the creator may be in the middle of a discussion when a viewer joins and thus, the viewer may not have the proper context to fully understand the ongoing discussion. This scenario may occur when a user is newly joining the live stream or when the user is rejoining the live stream after previously having been diverted away. Joining a live stream at a suboptimal moment leads to a poor user experience and may even demotivate users from partaking in future live streams.

SUMMARY

A stream hosting server generates anchors in a live stream that enables users that are newly joining to begin consuming the streaming content at an opportune time point, even if the user joins at a suboptimal time. The stream hosting server provides a platform for a creator to transmit live streams. At various time points during the live stream, the server provides user interface elements that receive creator input indicating that a time point is appropriate for the generation of a live stream anchor. For example, the user interface elements receive an input to create an anchor when the creator is moving on to discuss a new subject matter. In another example, the live stream is a streaming video game and the user interface elements receive an input to generate an anchor corresponding to a timestamp in the live stream when a new game is starting. Each anchor specifies a timestamp of the live stream as well as a validity duration. The validity duration of the anchor describes how long the anchor remains valid such that users that join can start watching the live stream at the anchor if the anchor is valid.

A viewer client device provides a request to the stream hosting server to join a live stream. The request sent by the client device is sent at a particular time and is therefore, associated with a timestamp of the live stream. In one embodiment, the stream hosting server analyzes the list of generated anchors and identifies an appropriate anchor from which the viewer client device will begin accessing the live stream. The appropriate anchor is selected based on the timestamp of the live stream specified by the anchor and the validity duration associated with the anchor. The stream hosting server provides the live stream to the viewer client device beginning at the timestamp specified by the identified anchor.

The stream hosting server may also be capable of generating video on demand (VOD) content derived from a completed live stream. Additionally, the generated anchors associated with the completed live stream are also included in the created VOD. The anchors in the VOD serve multiple purposes. In one scenario, the VOD can be presented by a viewer client device to a user. Upon receiving user inputs, the viewer client device can display the VOD at different timestamps that are specified by the anchors associated with the VOD. This is desirable in gaming streams where conversational scenes of a VOD can be rapidly skipped over. Thus, the VOD with associated anchors enables skipping to the beginning of the next game.

Additionally, the anchors in a VOD may be tagged with a subject matter tag such as a keyword. When the stream hosting server receives a query including a keyword (or subject matter tag more generally), the stream hosting server returns a list of anchors that are relevant to the provided keyword. Thus, the server enables a viewer client device to access a VOD beginning at an anchor with a particularly relevant subject as opposed to having to display the VOD from the beginning.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
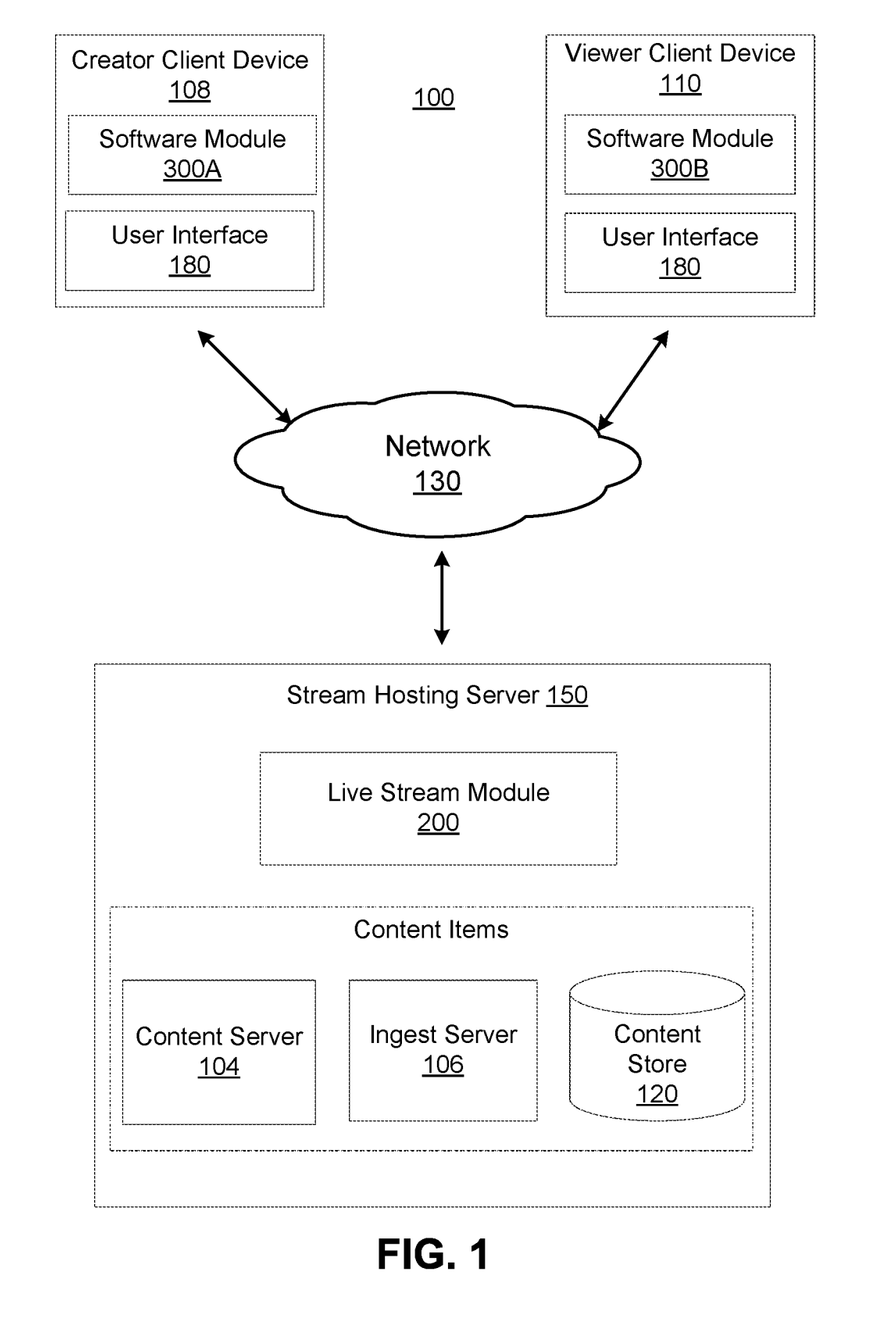
FIG. 1 is a system environment of a stream hosting server, in accordance with an embodiment.

FIG. 1 depicts a system environment 100 of a stream hosting server 150 for providing a live stream, in accordance with an embodiment. The system environment 100 includes a creator client device 108, a viewer client device 110, a network 130 and a stream hosting server 150.

Turning to the individual entities illustrated in FIG. 1, the creator client device 108 and the viewer client device 110 generate a live stream and accesses a live stream, respectively. As used herein, a "live stream" relates to any streamed media content distributed between creators and viewers (or listeners, in the case of audio content), regardless of whether that content is broadcast, multicast, or directly exchanged between a creator and a single viewer.

Each of the creator client device 108 and the viewer client device 110 is a computing device with a software module 300A/B that transmits and/or receives data via the network 130. Examples of the creator client devices 108 and viewer client devices 110 include desktop computers, laptop computers, tablet computers (pads), mobile phones, personal digital assistants (PDAs), gaming devices, or any other electronic device including computing functionality and data communication capabilities. The creator client device 108 and viewer client device 110 may each use a web browser, such as Microsoft Internet Explorer, Mozilla Firefox, Google Chrome, Apple Safari and/or Opera, as an interface to connect with the network 130. Additionally or alternatively, specialized application software that runs natively on a mobile device is used as an interface to connect to the network 130. The creator 108 and viewer client devices 110 typically include a processor, a display device (or output to a display device), a local storage, such as a hard drive or flash memory device, to which the creator 108 and viewer client devices 110 store data used by the user in performing tasks, and a network interface for coupling to the stream hosting server 150 via the network 130. Although FIG. 1 depicts one creator client device 108 and one viewer client device 110, one skilled in the art may appreciate that any number of creator client devices 108 and viewer client devices 110 may exist in the system architecture in communication with the network 130 and the stream hosting server 150.

The creator client device 108 is used by a creator to generate a live stream. The creator client device 108 receives user inputs through the user interface 180. For example, creator client device 108 (e.g. a laptop) receives inputs that instruct the creator client device 108 to use software or hardware to continuously capture video and audio in real time or near-real time for generating the live stream. In various embodiments, the creator client device 108 also includes a software module 300A that appropriately processes the video and audio of the live stream as it is recorded. The creator client device 108 then continuously transmits the stream to the stream hosting server 150 until the stream ends.

The viewer client device 110 sends a request to access the live stream and upon receiving the live stream, begins to access the live stream at a timestamp specified by an anchor associated with the live stream. The viewer client device 110 includes a user interface 180 and a software module 300B that together handle the interaction between a user of the viewer client device 110 and content provided by the stream hosting server 150.

For example, the user interface 180 receives a user input (e.g. a click, a touch input) to join a live stream. The software module 300 sends a join request to the stream hosting server 150 for the live stream. At a time subsequent to sending the join request, the software module 300 receives the live stream with an identified anchor that specifies a timestamp of the live stream. Upon receiving the live stream, the software module 300 appropriately decodes the video and audio of the live stream for playback on a user interface 180 of the viewer client device 110. The viewer client device 110 proceeds to display the live stream beginning at the timestamp specified by the anchor.

The stream hosting server 150 is responsible for receiving live streams from creator client devices 108, generating anchors associated with the live stream under a variety of circumstances, for example in response to an anchor generation request from a creator client device 108, and providing the live stream for playback on a number of different viewer client devices, each possibly starting and progressing forward from different timestamps within the stream as specified by one or more anchors. In an example embodiment, the stream hosting server 150 includes a live stream module 200, content server 104, ingest server 106, content store 120.

The live stream module 200 handles live streams. On the server side, the live stream module 200 receives a stream to be transmitted to viewer client devices 110 and also receives anchor generation requests. As introduced above, each anchor specifies a timestamp in the live stream such that the live stream module 200 can provide the live stream to a viewer client device 110 beginning at the timestamp. On the viewer side, the live stream module 200 receives join requests from one or more viewer client devices 110 to join the live stream. The live stream module 200 analyzes and identifies an appropriate anchor associated with the live stream for each join request. The live stream module 200 provides the viewer client device 110 with the live stream and the anchor specifying a timestamp in the live stream such that the viewer client device 110 can begin playing the live stream beginning at the timestamp. Further details regarding the live stream module 200 is described below in regards to FIG. 2.

The live stream module 200 is also responsible for providing content items (e.g. video advertisements) to viewer client devices 110. For example, the content item may be originally provided by a third party system (e.g. an advertiser) and received by the ingest server 106. The ingest server 106 handles the provided content item and stores the content item in the content store 120. The content server 104 retrieves a content item that is located in the content store 120 and serves the content item to a viewer client device 110 to be displayed on the user interface 180 of the viewer client device 110. As one example, the content item is to be displayed on the viewer client device 110 to temporarily replace the live stream. Once the viewer client device 110 plays the content item for its duration, the viewer client device 110 returns to playing the live stream at a generated anchor.

The network 130 facilitates communications amongst one or more client devices 110 and the stream hosting server 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Live Stream Module

Figure 2:
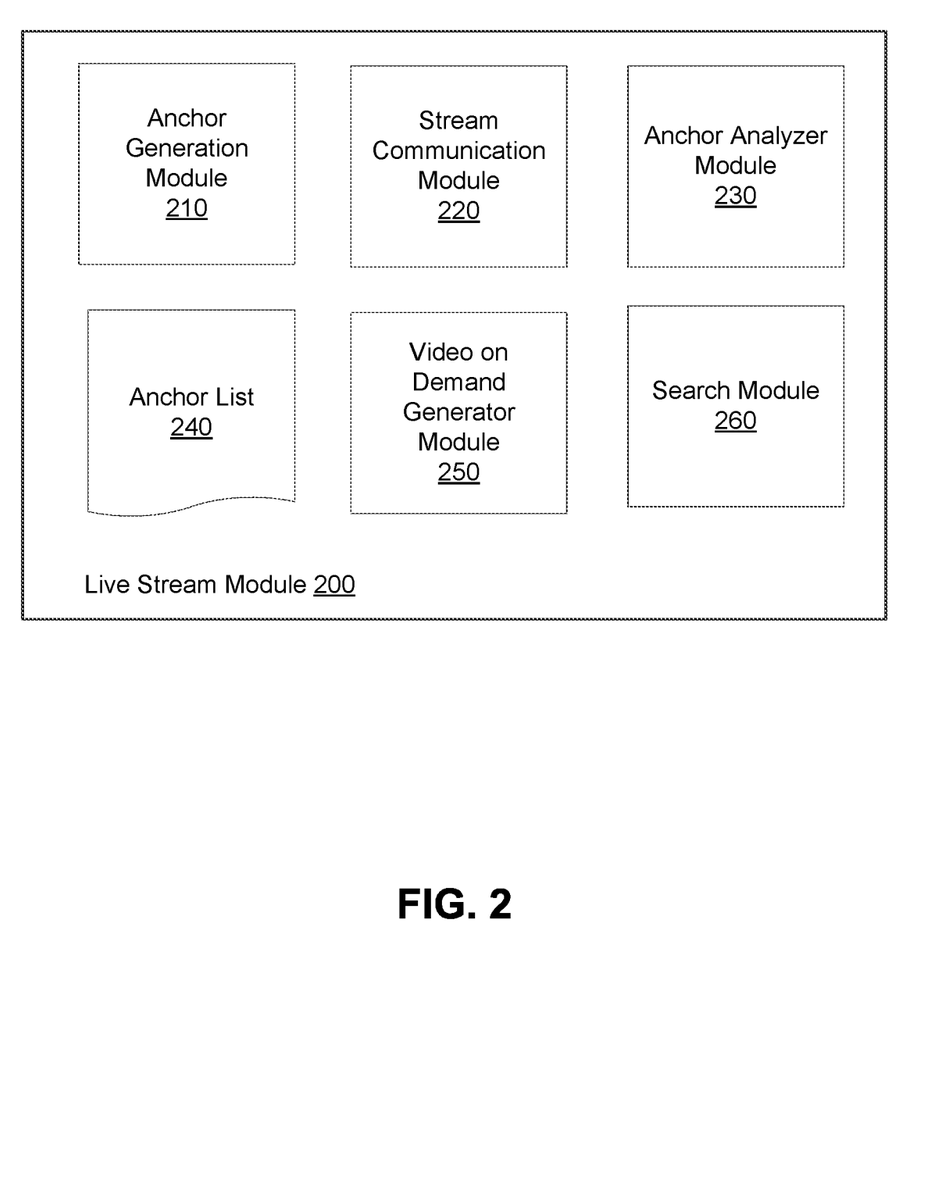
FIG. 2 depicts the architecture of the live stream module, in accordance with an embodiment.

FIG. 2 depicts the live stream module 200 and its associated modules, in accordance with an embodiment. In this example embodiment, the live stream module 200 includes an anchor generation module 210, a stream communication module 220, an anchor analyzer module 230, an anchor list 240, a video on demand (VOD) generator module 250, and a search module 260. In some embodiments, the live stream module 200 has different modules and/or logical structures than the ones described herein, and the functions can be distributed among the modules and/or logical structures in a different manner than described here.

The anchor generation module 210 generates one or more anchors to be associated with a live stream. Each anchor represents an opportune timestamp in the live stream for the viewer client device 110 to access the live stream. For example, in a gaming stream, an anchor may be associated with a time point corresponding to the beginning of a new game. As another example, a creator may switch from a first subject to a second subject during a live stream.

The anchor generation module 210 permits a creator to create an anchor through the graphical user interface 180 presented on the creator client device 108. The creator can choose to place an anchor at the current timestamp of the ongoing live stream at his/her discretion. For example, the creator provides a user input (e.g. a click on a button or a drag and drop) on the graphical user interface. As another example, the creator may, at a later time, manually specify a timestamp occurring earlier in the live stream to generate an anchor. This is useful for a creator that may have forgotten to generate anchors in real-time. In response to a user input to generate an anchor in the live stream, the creator client device 108 sends an anchor generation request to the anchor generation module 210 which then proceeds to generate the anchor. In various embodiments, the anchor generation module 210 may provide notifications to viewer client devices 110 that are currently accessing the live stream when the new anchor is generated.

Each anchor is associated with the live stream and specifies: 1) a timestamp within the duration of the live stream and 2) a validity duration. For example, the timestamp of the live stream corresponds to the time point in the live stream that coincided with when the creator provided the input to create the anchor. As another example, the timestamp corresponds to the time that is manually specified by the creator.

The validity duration of an anchor describes a period of time that the anchor is valid for after being generated. Once the validity duration of an anchor expires, a viewer client device 110 can no longer access the live stream beginning at that anchor. In some embodiments, the validity duration of an anchor is predetermined by the anchor generation module 210. In other embodiments, the validity duration of each anchor may be manually specified by the creator. For example, before the live stream begins, the anchor generation module 210 may prompt the creator to enter a default validity duration (e.g. 5 minutes) for each anchor that is to be generated during the live stream. Additionally, the anchor generation module 210 may prompt the creator to enter a validity duration for each generated anchor in real-time (e.g. immediately after the creator specifies the creation of an anchor).

The generation of an anchor may also be performed automatically by the anchor generation module 210 without intervention from the creator. The anchor generation module 210 may implement a machine learning model that analyzes the preferences and/or characteristics of the creator to understand the likely position of an appropriate anchor. For example, a creator may be prone to a moment of silence that lasts beyond a threshold time as the creator contemplates what to say for the next subject matter. Therefore, the machine learning model may choose to embed an anchor in the live stream when a longer than threshold silence duration occurs in the stream. As another example, a creator may use a particular phrase that indicates that a new topic is starting (e.g. "Okay, shifting gears . . . "). The machine learning model may be specifically trained to recognize the tendencies or used phrases of the creator and generates anchors accordingly.

Each generated anchor is stored in the anchor list 240. The anchor list 240 may be a readable data file or database table that stores an associated stream, an identifier of the anchor (e.g. anchor 1, anchor 2, etc.), the timestamp, and the validity duration associated with each anchor.

The stream communication module 220 receives the live stream from the creator client device 108 and is responsible for processing, storing and/or buffering, and transmitting the stream to one or more viewer client devices 100. One example for processing the stream includes transcoding the live stream received from the creator client device 108. For example, the video and audio may have been previously encoded by the creator client device 108. The video may be in a H.264 format and the audio in an advanced audio coding (AAC) format. The stream communication module 220 may transcode the video to a different format, video resolution, and/or frame rate and transcode the audio to a different format or different bit rate. The transcoded video and audio are transmitted by the stream communication module 220 to the viewer client device 110 according to standard protocols (e.g. real-time transport protocol (RTP), real-time messaging protocol (RTMP), user datagram protocol (UDP), transmission control protocol (TCP)).

The stream communication module 220 handles communications with the various viewer client devices 110. For example, the stream communication module 220 receives requests from various viewer client devices 110 to access the live stream and additionally provides the live stream beginning at a timestamp specified by a generated anchor. One type of request is a join request that originates from a viewer client device 110 that is newly accessing the live stream. Another type of request is a rejoin request from a viewer client device 110 that was previously accessing the live stream, temporarily exited, and is now attempting to rejoin the stream.

In a use case where a join request is received, responsive to receiving the join request from a viewer client device 110, the stream communication module 220 provides the timestamp associated with the join request to the anchor analyzer module 230. The anchor analyzer module 230 selects an anchor from the anchor list 240 depending on the provided timestamp associated with the join request. Details regarding the analysis and selection of an anchor is described further below.

The stream communication module 220 receives, from the anchor analyzer module 230, an identified anchor from the anchor list. The identified anchor specifies a timestamp of the live stream from when the viewer client device 110 is to begin accessing the live stream. Therefore, the stream communication module 220 provides the live stream to the client device 110 beginning at the timestamp specified in the selected anchor.

A use case where a rejoin request is received includes where the viewer client device 110 accesses the live stream, is diverted from the live stream to play a content item, and then attempts to rejoin the live stream upon finishing the content item. As an example, a content item is an advertisement that is intended to temporarily replace the live stream displayed on a viewer client device 110. The advertisement can be a TrueView advertisement which allows a user to skip the advertisement after a threshold period of time (e.g. 5 seconds). Therefore, a user may finish with a content item by providing a user input (e.g. a click) to skip it after the threshold amount of time. When the content item finishes playing, the viewer client device 110 sends a rejoin request to the stream communication module 220. Thus, the anchors of the live stream are advantageous as they enable the viewer client device 110 to rejoin the live stream at an opportune timestamp after having watched a content item.

To enable the viewer client device 110 to appropriately depart the live stream and play the content item, the stream communication module 220 provides further instructions to the viewer client device 110 in addition to the content item. As one example, the instructions including encoding/decoding information of the content item such that the viewer client device 110 can adequately playback the video and audio data of the content item. As another example, the stream communication module 220 further delivers a departure time interval. The departure time interval represents a length of time that the viewer client device 110 can access the live stream before being diverted away from the live stream to the content item. Upon expiration of the departure time interval, the viewer client device 110 temporarily exits the live stream to display the content item. When the viewer client device 110 exits the live stream, it records a timestamp of the live stream that corresponds to when it exited (e.g. a departure timestamp).

While the content item is temporarily played by the viewer client device 110 (i.e., coinciding with or after the departure timestamp), the anchor generation module 210 may generate additional anchors for the live stream. When the stream communication module 220 receives a rejoin request after the playing of the content item is terminated, the stream communication module 220 also receives the departure timestamp from the viewer client device 110. The stream communication module 220 passes the received departure timestamp to the anchor analyzer module 230 such that an appropriate anchor can be identified given the rejoin request. When the stream communication module 220 receives the identified, appropriate anchor from the anchor analyzer module 230, the stream communication module 220 provides the live stream beginning at the timestamp specified by the appropriate anchor. Thus, the stream communication module 220 allows the viewer client device 110 to rejoin the live stream by providing the live stream beginning at the identified anchor. More generally, the implementation of the generated anchors allows the user of the viewer client device 110 to miss none or a very minimal amount of the live stream or rejoin at an appropriate anchor point when being diverted to watch a content item.

The stream communication module 220 is capable of providing information to the viewer client device 110 indicating that the live stream is currently in a "semi-live" state. For example, the viewer client device 110 displays on the user interface 180, to the viewing user, an indication of the semi-live state on a graphical user interface (GUI). The indication may be a colored button or indicator. Additionally, the viewer client device 110 may also present a selectable option on the GUI to the user. When the GUI receives a user input, the viewer client device 110 sends a request to the stream communication module 220 to access the live segment of the live stream. Thus, this provides the user of the viewer client device 110 the control in regards to watching the live stream in a live or semi-live state. In response to the request, the stream communication module 220 provides the live segment of the live stream to the viewer client device 110. The viewer client device 110 can change the indication on the GUI to display a different indicator (e.g. a different color or a different button) such that the user can readily understand that the live stream is now in a live state.

The anchor analyzer module 230 selects an appropriate anchor from the anchor list 240 such that the viewer client device 110 can join or rejoin the live stream at an opportune timestamp specified by the anchor. The anchor analyzer module 230 selects an anchor as the appropriate anchor based on the timestamp specified by the anchor, the validity duration specified by the anchor, and the timestamp associated with the join or rejoin request sent by the client device 110. The anchor analyzer module 230 may default to a scenario where no anchor is selected. In this case, the anchor analyzer module 230 instructs the stream communication module 220 to provide the live stream to a viewer client device 110 at its current live moment as opposed to beginning at an anchor.

The anchor analyzer module 230 identifies an appropriate anchor from an anchor list 240 through a process that is dependent on the type of request (e.g. a join or rejoin request) that was sent by the viewer client device 110. For example, if the viewer client device 110 is newly joining the live stream (e.g. join request), the anchor analyzer module 230 retrieves an anchor list 240 that includes all generated anchors associated with the live stream. Alternatively, if the viewer client device is rejoining the live stream (e.g. rejoin request), the anchor analyzer module 230 retrieves an anchor list that only includes anchors that were generated while the content item was playing on the viewer client device 110.

Of the anchors in the retrieved anchor list 240, the anchor analyzer module 230 determines which anchors remain valid based on the validity duration associated with each anchor. To do this, the anchor analyzer module 230 calculates the difference between the timestamp specified by the anchor and a timestamp associated with when the join or rejoin request was sent. The difference is compared to the validity duration associated with the identified anchor. If the difference falls below the validity duration, indicating that the anchor is valid, then the anchor analyzer module 230 tags the anchor as valid. Alternatively, if the difference between the current time and the timestamp specified by the identified anchor is above the validity duration, then the anchor is tagged as invalid. The invalid anchors are disregarded from further consideration whereas the valid anchors are further analyzed. In the scenario that all the anchors in the anchor list 240 are invalid, the anchor analyzer module 230 proceeds with the default case and instructs the stream communication module 220 to provide the live stream in the live state.

Having identified the valid anchors, the anchor analyzer module 230 identifies an anchor depending on whether the viewer client device 110 has sent a join request or a rejoin request to the stream communication module 220. If the viewer client device 110 is newly joining the live stream, the anchor analyzer module 230 identifies and selects the most recent anchor in the anchor list 240. The most recent anchor specifies a timestamp in the live stream that is more recent than timestamps specified by all other anchors in the anchor list 240.

If the viewer client device 110 is rejoining the live stream after having been temporarily diverted away (e.g. diverted to watch a content item), the anchor analyzer module 230 identifies when the viewer client device 110 exited the live stream (e.g. departure time). The departure time can be previously sent by the viewer client device 110 along with the rejoin request. The anchor analyzer module 230 selects the anchor with a timestamp that is nearest to the identified departure time. The timestamp of an anchor nearest to the identified departure time may occur prior to the identified departure time, meaning that upon rejoining the live stream at that anchor, the viewer client device 110 would replay a portion of the live stream. In this scenario, the viewer client device 110 avoids skipping over any portion of the live stream. Alternatively, the timestamp of an anchor nearest to the identified departure time may occur subsequent to the identified departure time. Therefore, the viewer client device 110 can rejoin the live stream at the opportune timestamp of the anchor while having missed very little of the live stream.

Once the anchor analyzer module 230 has identified the appropriate anchor, the anchor analyzer module 230 instructs the stream communication module 220 to send the live stream to a viewer client device 110 beginning at the selected anchor.

After a live stream is completed, the VOD generator module 250 obtains the stream and generates a video on demand (VOD) to be stored in the content store 120. Thus, the viewer client device 110 can access the VOD at a subsequent time and display the live stream even though it is no longer live-streaming. In generating the VOD, the VOD generator module 250 associates the generated anchors that were originally created during the live stream with the VOD. For example, the VOD generator module 250 encodes the dropped anchors along with the stream. Additionally, the VOD generator module 250 creates an associated data file (or database table) that includes the timestamp specified by each anchor in the stream as well as a tag (e.g. descriptive keyword) that describes each anchor. For example, an anchor may indicate that the creator switched from talking about a topic of dogs to a topic of cats at a timestamp in the stream. Therefore, the data file may tag the anchor at the timestamp with the particular subject matter regarding cats. The data file may include more than one tag for each anchor.

The search module 260 enables users of viewer client devices 110 to effectively search through VOD's for an anchor that is of interest. Therefore, the search module 260 provides improved search granularity a viewer client device 110 can access specific anchors within a VOD instead of having to access the VOD from the beginning. For example, the search module 260 receives a search query and parses the query for keywords. The search module 260 searches the content store 120 for an anchor in a VOD that matches the query or a keyword in the query. For example, if a query from a client device searches for "puppies," the search module 260 searches the metadata file associated with each VOD to identify anchors that are tagged with the subject matter of "puppy" or "puppies." The match may be a text string match between the search query and the keyword associated with the anchor. The search module 260 returns the search result of anchors that are tagged with the matching subject matter to the viewer client device 110 that sent the query. If a user of the viewer client device 110 selects an anchor, indicating that he/she is interested in watching a VOD starting at that anchor, the search module 260 retrieves, from the content store 120, the appropriate video segment in the VOD beginning at that anchor and provides it to the viewer client device 110. This enables a user to view relevant clips of a VOD file as opposed to having to view the entire VOD that may not be entirely relevant to the provided query.

Software Module

Figure 3A:
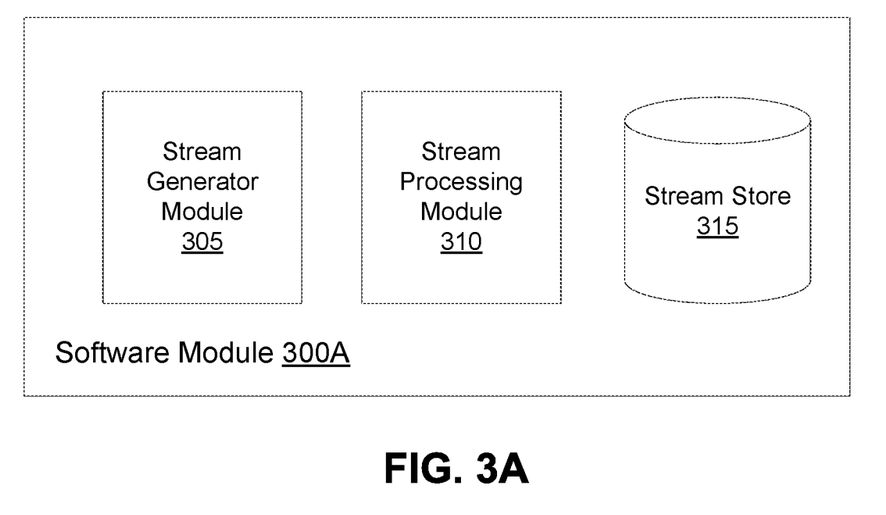
FIG. 3A depicts the architecture of a software module of the creator client device, in accordance with an embodiment.

FIG. 3A depicts the software module 300A on the creator client device 108 and its associated modules, in accordance with one embodiment. The software module 300A includes a stream generator module 305 and a stream processing module 310.

The stream generator module 305 generates the video and audio of the stream obtained from a hardware (e.g., a camera) or software (e.g., a video game) source communicatively coupled to, a part of, or operating on the viewer client device 110. The generated stream is stored in the stream store 315. The stream generator module 305 sets the characteristics of the live stream including the video resolution, video frame rate, and audio bit rate. Alternatively, the characteristics of the live stream can be set by the creator to provide the optimal live-stream viewing experience for his/her viewers.

The stream generator module 305 passes along portions of the live-stream as they are captured to the stream processing module 310. Therefore, the stream processing module 310 can process and transmit the stream while the stream generator module 305 continues to record new portions of the live stream. The stream processing module 310 encodes the video and audio according to characteristics (e.g. resolution, frame rate, bit rate) of the video and audio. As an example, the video is encoded using a H.264 encoder while the audio is separately encoded using an AAC encoder. Once encoded, the stream processing module 310 proceeds to transmit the encoded video and audio to the stream hosting server 150.

The stream processing module 310 uses standard protocols (e.g. RTP, RTMP, UDP, TCP) to transmit the encoded video and audio of the live-stream to the stream hosting server 150. For example, RTP over UDP is preferred for a live stream to ensure that the viewers can watch the stream with limited delay.

Figure 3B:
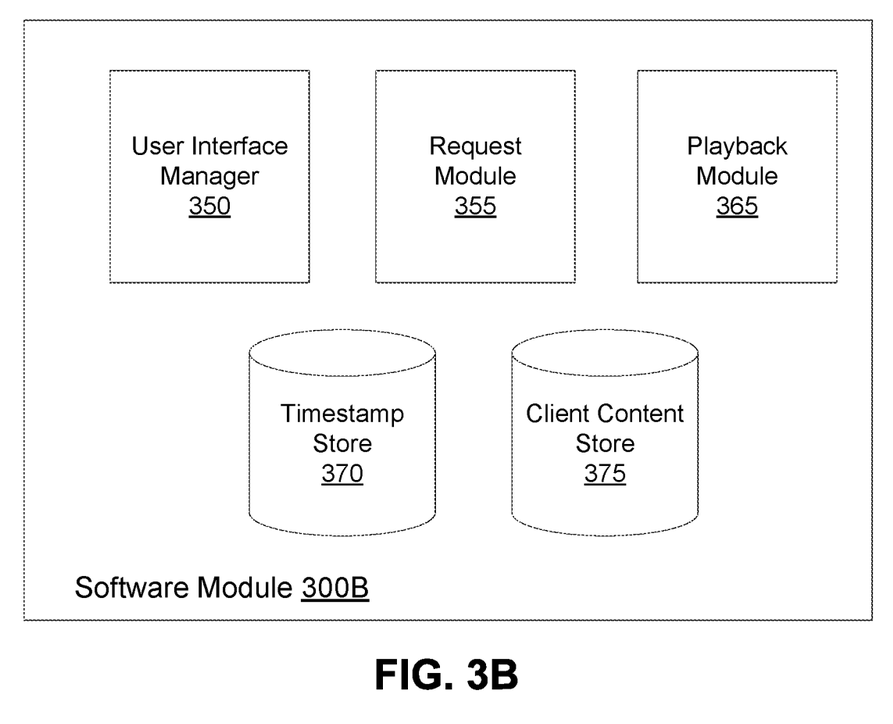
FIG. 3B depicts the architecture of a software module of the viewer client device, in accordance with an embodiment.

FIG. 3B depicts the software module 300B on the viewer client device 110 and its associated modules, in accordance with one embodiment. The software module enables the viewer client device 110 to access the live stream. In various embodiments, the software module 300 includes a user interface manager 350, a request module 355, and a playback module 365. In some embodiments, the software module 300A/300B of either the creator client device 108 or the viewer client device 110 has different modules and/or logical structures than the ones described herein, and the functions can be distributed among the modules and/or logical structures in a different manner than described here.

The user interface manager 350 receives from and provides information through the user interface 180 to the user of the client device 110. For example, the client device pray be a mobile client device (e.g. cell phone) with a touch display interface. Therefore, the user interface manager 350 receives touch inputs and also displays the live stream for viewing through the user interface 180. The user interface manager 350 may provide information during the live stream. As previously mentioned, the user interface manager 350 provides a GUI on the user interface 180 of the viewer client device 110. The GUI may provide an indication (e.g. a yellow button) that current stream is in a semi-live state as opposed to a live state (e.g. a green button. As another example, the user interface manager 350 may provide notifications whenever a new anchor has been generated in the live stream.

The user interface manager 350 presents VOD with anchors to the viewer client device 110. In displaying a VOD, the user interface manager 350 may present, through the user interface 180, additional selectable options. For example, selectable options may be forward or back arrows displayed on the user interface 180. When a user input is received on the forward arrow, the user interface manager 350 identifies the subsequent anchor (e.g. anchor specifying the next timestamp in the VOD) and displays the VOD at that anchor. Similarly, if a user input is received on a back arrow, the user interface manager 350 identifies the previous anchor (e.g. anchor specifying the previous timestamp in the VOD) and displays the VOD at the previous anchor.

The user interface manager 350 may maintain a counter that tracks the number of times that users start or skip from an anchor in a VOD. The counter represents the popularity of the anchor in the VOD. The updated counter information may be provided to the stream hosting server 150 to further improve search functionality. For example, viewer client devices 110 may transmit a search for the term "puppies" and then subsequently receive a particular anchor in a VOD that is associated with "puppies." If the majority of viewer client devices 110 that had provided the "puppies" search query end up displaying the VOD starting at the anchor (e.g.

not skipping the anchor), that information may be provided back to the stream hosting server 150. Alternatively, if a majority of viewer client devices 110 that had provided the "puppies" search query briefly display the VOD starting at the anchor, but quickly stop watching, the keyword of "puppies" may be a poor topic association with the anchor. The stream hosting server 150 can use the information to adjust the keyword labels that are associated with the anchor and further update ranking algorithms for running search queries that identify anchors in the VOD content.

The user interface manager 350 recognizes when the viewer client device 110 is displaying the VOD and when the viewer client device 110 stops displaying the VOD. At a subsequent time, if the viewer client device 110 is instructed to begin displaying the VOD again, the viewer client device 110 can begin displaying at a relevant point of the VOD specified by the anchor. In an example scenario, the user interface manager 350 may present the VOD on a webpage and the user decides to scroll up or down on the webpage such that the VOD is no longer in view. Thus, the user interface manager 350 records a timestamp that indicates when the viewer client device 110 stopped displaying the VOD. The VOD will stop playing if the VOD is no longer in view. At a subsequent time, the user may scroll back to the VOD. Therefore, the user interface manager 350 receives an indication that the viewer client device 110 is continuing to display the VOD. The user interface manager 350 may begin playing the VOD at the nearest anchor which may be either before or after the timestamp that indicated when the viewer client device 110 stopped displaying the VOD.

The user interface manager 350 receives an input indicating that the user would like to access a live stream. The user interface manager 350 provides this input to the request module 355. The request module 355 is configured to provide a variety of different requests from the viewer client device 110 to the stream hosting server 150. As a first example, in response to receiving the user input from the user interface manager 350, the request module 355 sends a join or rejoin request (depending on whether the user is newly joining or rejoining) to the stream hosting server 150. In a second example, the request module 355 can send user queries to the stream hosting server 150 to search through anchors of VODs that may be relevant to the user query. Each of these examples are described further below.

Referring to the first example, when a viewer client device 110 desires to access the live stream, the request module 355 determines whether to send a join request or a rejoin request. For example, if the viewer client device 110 is newly accessing the live stream, then the request module 355 chooses to send a join request. If the viewer client device 110 had previously accessed the live stream and was temporarily diverted away (e.g. 1-5 minutes), the request module 355 chooses to send a rejoin request. In some cases, the request module 355 chooses to send a join request as opposed to a rejoin request even if the viewer client has previously accessed the stream. For example, the request module 355 determines that the viewer client device had previously accessed the live stream, but exited the stream over a threshold amount of time ago (e.g. 30 minutes, 1 hour). Therefore, the request module 355 treats this viewer client device 110 as a new join request.

The request module 355 may send a rejoin request to the stream hosting server 150 along with a timestamp retrieved from the timestamp store 370. The included timestamp is helpful for the stream hosting server 150 to determine when the viewer client device 110 previously left the live stream. For example, a viewer client device 110 may be previously accessing the live stream and was subsequently diverted to watch a content item at a departure timestamp of the live stream. Therefore, when the viewer client device 110 attempts to rejoin the stream, the request module 355 sends the departure time along with the rejoin request to the stream hosting server 150. The stream hosting server 150 determines the anchors that were generated while the client device 110 was playing the content item based on the departure time.

Referring now to a second example, the request module 355 also handles submitted user queries to search through VODs for anchors that are associated with a particular topic of interest. The request module 355 transmits the search request to the search module 260 of the stream hosting server 150. For example, the request module 355 may send a search request for "puppies." In return, the viewer client device 110 receives a list of anchors that are associated with the subject matter of "puppies," The list of anchors may be presented in an ordered ranked according to a search algorithm utilized by the search module 260. Therefore, a user can select and play a VOD from an anchor that pertains to the particular topic of interest included in the search query.

In some embodiments, the software module 300B of the viewer client device 110 further includes the anchor analyzer module 230 and is responsible for identifying the appropriate anchor to begin accessing the live stream. Therefore, instead of the anchor analyzer module 230 being a module of the stream hosting server 150, this embodiment includes the anchor analyzer module 230 in the viewer client device 110.

The anchor analyzer module 230 on the viewer client device 110 receives the anchor list 240 from the stream hosting server 150. As one example, the anchor analyzer module 230 automatically identifies the appropriate anchor based on the timestamp of each anchor in the anchor list 240 and the timestamp associated with the join or rejoin request. As described previously, if the request is a join request, the anchor analyzer module 230 selects the anchor that specifies the most recent timestamp. If the request is a rejoin request, the anchor analyzer module 230 selects the anchor that specifies a timestamp that is nearest to the departure time.

As a second example, the anchor analyzer module 230 may ask a user of the viewer client device 110 for a user input in identifying the appropriate anchor. The anchor analyzer module 230 presents the anchors in the anchor list 240 on the user interface 180 of the viewer client device 110 and receives a user input specifying the appropriate anchor to join or rejoin the stream at. In this example, the anchor analyzer module 230 provides the user with the final control over where to begin watching in the live stream.

The playback module 365 receives, from the stream hosting server 150, the live stream to be played on the viewer client device 110 based on the identified anchor. The live stream may contain additional instructions in a metadata file as to how the playback module 365 is to play the live stream (e.g. decoder, video resolution, and audio bitrate). For example, the playback module 365 may receive the live stream and associated audio files and may decode them separately before playing them on the user interface manager 350 of the viewer client device 110.

The playback module 365 also receives content items from the stream hosting server 150 to be played on the client device 110. The content items may be stored in the client content store 375. Additionally, the content item may have associated instructions (e.g. stored in a metadata file associated with the content item) that instruct the client device 110 to play the content item at a departure timestamp of the live stream. Thus, the client device 110 automatically diverts to playing the content item at the departure timestamp. This departure timestamp may be stored in the timestamp store 370 and used for further analysis by the anchor analyzer module 360 when the client device 110 is to rejoin the live stream.

Providing a Live Stream

Figure 4:
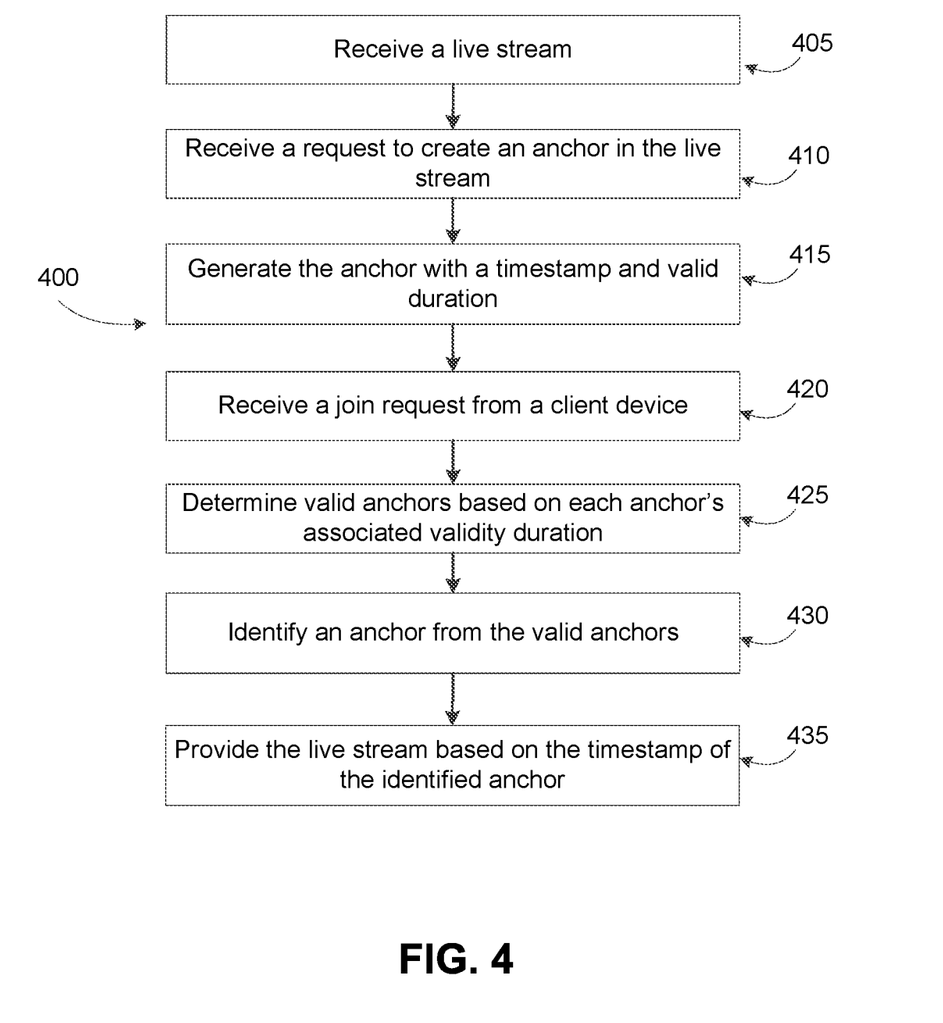
FIG. 4 is an example flow chart of providing, by the stream hosting server, a live stream based on a generated anchor, in accordance with an embodiment.

FIG. 4 depicts an example flow chart of the stream hosting server 150 providing a live stream to be played on a client device 110 based on a generated anchor, in accordance with an embodiment. The stream hosting server 150 receives 405 a live stream from a creator client device 108. The stream hosting server 150 receives 410) a request to generate an anchor from the creator client device 108 at a timestamp of the live stream.

The stream hosting server 150 generates 415 anchors while the live stream is ongoing. As described above, each anchor is generated with a timestamp and a validity duration. The stream hosting server 150 receives 420 a request (e.g. join request or rejoin request) from a client device and determines 425 anchors that are valid based on the validity duration associated with each anchor. From the list of anchors that are valid, the stream hosting server 150 identifies 430 an anchor. For example, if the received request was a join request, the stream hosting server 150 identifies the anchor that specifies the most recent timestamp. If the received request was a rejoin request, the stream hosting server 150 identifies the anchor that specifies a timestamp closest to the departure timestamp. Once the stream hosting server 150 has identified the anchor, the stream hosting server 150 provides 435 the live stream to the viewer client device 110 for playback beginning at the timestamp specified by the identified anchor.

Requesting and Playback of a Live Stream

Figure 5:
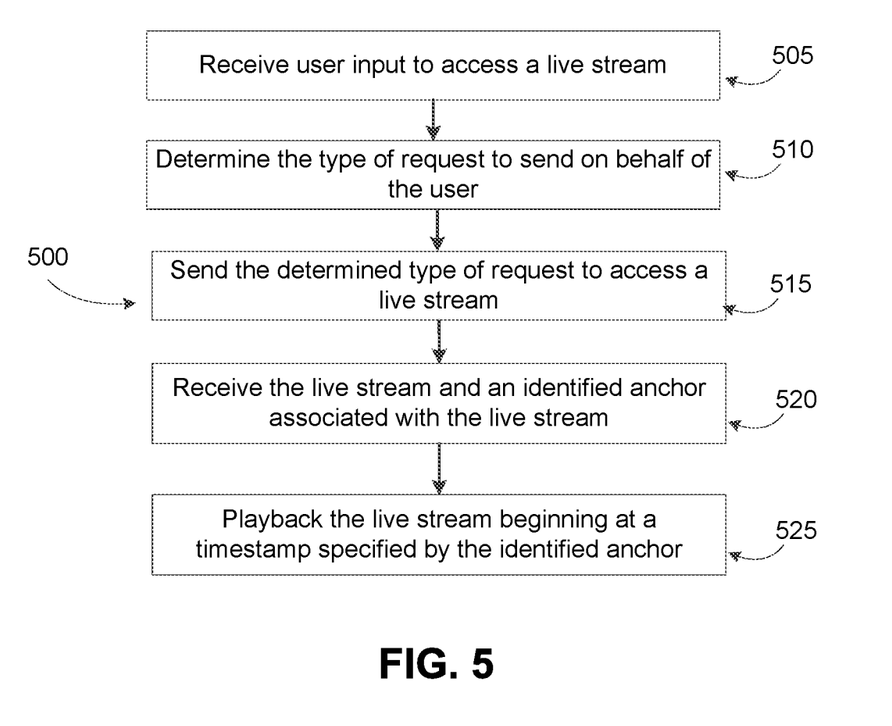
FIG. 5 is an example flow chart of playing back, by a viewer client device, a live stream according to a generated anchor, in accordance with an embodiment.

FIG. 5 depicts an example flow chart of playing back, by a viewer client device 110, a received live stream based on a generated anchor, in accordance with an embodiment. A viewer client device 110 receives 505 user input specifying a desire to access a live stream. For example, a user may provide a touch input through the user interface 180. The viewer client device 110 determines 510 the type of request to send on behalf of the user. For example, the viewer client device 110 determines whether the viewer client device 110 is newly accessing the live stream or if it is returning to the live stream after having been diverted. Thus, the request may be a join request or a rejoin request. The viewer client device sends 515 the request to access a live stream to the stream hosting server 150. If the viewer client device 110 is sending a rejoin request, the request further includes a departure timestamp associated with the viewer client device 110 previously departed the live stream.

The viewer client device 110 receives 520 the live stream along with an identified anchor that specifies a timestamp of the live stream. If the viewer client device 110 is newly joining the live stream, the identified anchor is the most recently generated anchor associated with the live stream. If the viewer client device 110 is rejoining the live stream, the identified anchor specifies a timestamp that is nearest to the departure time corresponding to when the viewer client device 110 departed the live stream. The viewer client device 110 plays back 545 the live stream for the user beginning at the timestamp specified by the identified anchor.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
generating an anchor associated with a live stream to be stored in an anchor list, each anchor in the anchor list specifying a timestamp of the live stream and a validity duration;
receiving, from a viewer client device, a request to access the live stream;
determining, by a processor, a validity of each anchor in the anchor list based on a difference between the timestamp specified by a respective anchor and a timestamp of the request to access the live stream satisfying a respective validity duration specified by each respective anchor to generate a list of valid anchors, the respective validity duration identifying a period of time during which each respective anchor is valid after being generated;

identifying an anchor from the list of valid anchors based, at least in part, on the timestamp specified by the identified anchor; and providing, to the client device, the live stream beginning at the timestamp specified by the identified anchor.

2. The method of claim 1, wherein determining the validity of each anchor in the anchor list based on the difference comprises:

comparing the difference to the validity duration specified by the respective anchor; and responsive to the determined difference being below the validity duration, establishing the respective anchor as a valid anchor.

3. The method of claim 1, wherein the received request to access the live stream is a join request, and wherein the identified anchor specifies a timestamp in the live stream that has most recently occurred in comparison to the timestamps specified by other anchors in the list of the plurality of anchors.

4. The method of claim 1 further comprising:

providing a content item to be presented on the client device, the provided content item associated with a departure time interval that specifies when the live stream accessed by the viewer client device is to be stopped and the content item is to be played by the viewer client device in place of the live stream.

5. The method of claim 4, wherein the provided content item enables a user of the viewer client device to skip the provided content item after a threshold amount of time.

6. The method of claim 4, wherein the received request to access the live stream is a rejoin request, and wherein each anchor in the anchor list is generated while the content item is played on the client device.

7. The method of claim 6, wherein the identified anchor specifies a timestamp of the live stream nearest to a departure timestamp corresponding to when the live stream accessed by the viewer client device was stopped to play the content item.

8. The method of claim 1, wherein the anchor is generated responsive to receiving a request from a creator client device.

9. The method of claim 8, wherein the received request from the creator client device is sent in response to an input provided by the creator on a graphical user interface.

10. The method of claim 8, wherein the timestamp of the live stream specified by the generated anchor corresponds to the time when the input is provided by the creator.

11. The method of claim 1 further comprising:

sending a notification to one or more client devices currently accessing the live stream, the notification indicating the generation of the anchor.

12. A non-transitory computer-readable medium comprising instructions, which when executed by a processor, causes the processor to perform operations comprising:

generating an anchor associated with a live stream to be stored in an anchor list, each anchor in the anchor list specifying a timestamp of the live stream and a validity duration;

receiving, from a viewer client device, a request to access the live stream;

determining a validity of each anchor in the anchor list based on a difference between the timestamp specified by a respective anchor and a timestamp of the request to access the live stream satisfying a respective validity duration specified by each respective anchor to generate a list of valid anchors, the respective validity duration identifying a period of time during which each respective anchor is valid after being generated;

identifying an anchor from the list of valid anchors based, at least in part, on the timestamp specified by the identified anchor; and providing, to the client device, the live stream beginning at the timestamp specified by the identified anchor.

13. A method comprising:

receiving a user input to access a live stream;

sending, by the viewer client device, a request to access the live stream and an indication of whether the viewer client device has previously accessed the live stream;

receiving the live stream and an identified anchor specifying a timestamp of the live stream based on the request and the indication of whether the viewer client device has previously accessed the live stream; and displaying, by a processor of the viewer client device, the live stream beginning at the timestamp specified by the identified anchor.

14. The method of claim 13, wherein the sent request is one of a join request or a rejoin request based on whether the viewer client device has previously accessed the live stream over a threshold amount of time ago.

15. The method of claim 13, wherein the sent request to access the live stream is a join request, and wherein the identified anchor specifies a timestamp of the live stream that is nearest to a timestamp associated with the sent join request to access the live stream.

16. The method of claim 13, further comprising:

receiving a content item to be presented to a user on the viewer client device;

identifying a departure time interval of the live stream associated with the content item;

displaying the received content item in place of the live stream responsive to expiration of the departure time interval; and storing a departure timestamp of the live stream corresponding to when the received content item was displayed in place of the live stream.

17. The method of claim 16, wherein the request to access the live stream is a rejoin request and is sent responsive to having finished displaying the received content item to the user.

18. The method of claim 14, wherein the sent request to access the live stream is a rejoin request, and wherein the identified anchor specifies a timestamp nearest to the departure timestamp of the live stream.

19. The method of claim 11, further comprising:

providing an indication that the live stream is currently in a semi-live state; and providing a selectable indication that, when selected, transitions the live stream in the semi-live state to a live segment of the live stream.

20. A non-transitory computer-readable medium comprising instructions, which when executed by a processor, causes the processor to perform operations comprising:

receiving a user input to access a live stream;

sending, by the viewer client device, a request to access the live stream and an indication of whether the viewer client device has previously accessed the live stream;

receiving the live stream and an identified anchor specifying a timestamp of the live stream based on the request and the indication of whether the viewer client device has previously accessed the live stream; and displaying, by the viewer client device, the live stream beginning at the timestamp specified by the identified anchor.

\* \* \* \* \*